(12) United States Patent
Kresge et al.

(10) Patent No.: US 10,894,443 B2
(45) Date of Patent: Jan. 19, 2021

(54) EXPANSIBLE BARRIER FILM ASSEMBLIES

(71) Applicant: ExxonMobil Chemical Patents Inc., Baytown, TX (US)

(72) Inventors: Edward N. Kresge, Neshanic Station, NJ (US); Peter W. Manders, Hudson, OH (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 583 days.

(21) Appl. No.: 15/523,562

(22) PCT Filed: Nov. 6, 2015

(86) PCT No.: PCT/US2015/059570
§ 371 (c)(1),
(2) Date: May 1, 2017

(87) PCT Pub. No.: WO2016/099695
PCT Pub. Date: Jun. 23, 2016

(65) Prior Publication Data
US 2017/0313132 A1    Nov. 2, 2017

Related U.S. Application Data

(60) Provisional application No. 62/094,699, filed on Dec. 19, 2014.

(51) Int. Cl.
*B60C 5/14*    (2006.01)
*B60C 1/00*    (2006.01)
(Continued)

(52) U.S. Cl.
CPC .............. *B60C 5/14* (2013.01); *B32B 3/28* (2013.01); *B32B 3/30* (2013.01); *B32B 25/08* (2013.01);
(Continued)

(58) Field of Classification Search
CPC ... B60C 5/14; B60C 2005/145; B60C 1/0008; B32B 3/28; B32B 3/30; B32B 25/08;
(Continued)

(56) References Cited

U.S. PATENT DOCUMENTS 3,362,118 A    1/1968    Brunner
5,040,583 A    8/1991    Lin et al.
(Continued)

FOREIGN PATENT DOCUMENTS

EP    2 503 621 A        9/2012
JP    2000173559 A  *   6/2000
(Continued)

OTHER PUBLICATIONS

Translation of JP2000173559A. (Year: 2000).*
(Continued)

*Primary Examiner* — Catherine A. Simone (57) ABSTRACT

A barrier layer assembly is useful as a barrier component in articles subjected to repeated deformations. The barrier layer assembly has a support layer and a film layer. The barrier layer assembly has a bi-directionally corrugated surface. The surface may be an external or internal surface and is defined by non-sulcate furrows.

15 Claims, 4 Drawing Sheets

(51) Int. Cl.
*B32B 3/28* (2006.01)
*B32B 25/14* (2006.01)
*B32B 25/12* (2006.01)
*B32B 25/08* (2006.01)
*B32B 27/30* (2006.01)
*B32B 27/34* (2006.01)
*B32B 27/32* (2006.01)
*B32B 27/36* (2006.01)
*B32B 3/30* (2006.01)
*B32B 27/06* (2006.01)
*B32B 37/10* (2006.01)

(52) U.S. Cl.
CPC .............. *B32B 25/12* (2013.01); *B32B 25/14* (2013.01); *B32B 27/06* (2013.01); *B32B 27/30* (2013.01); *B32B 27/302* (2013.01); *B32B 27/304* (2013.01); *B32B 27/308* (2013.01); *B32B 27/32* (2013.01); *B32B 27/34* (2013.01); *B32B 27/36* (2013.01); *B32B 37/10* (2013.01); *B60C 1/0008* (2013.01); *B32B 2307/51* (2013.01); *B32B 2307/546* (2013.01); *B32B 2307/7242* (2013.01); *B32B 2307/7244* (2013.01); *B32B 2605/00* (2013.01); *B60C 2005/145* (2013.01)

(58) Field of Classification Search
CPC ......... B32B 25/12; B32B 25/14; B32B 27/06; B32B 27/30; B32B 27/302; B32B 27/304; B32B 27/308; B32B 27/32; B32B 27/34; B32B 27/36; Y10T 428/24779; Y10T 428/24678; Y10T 428/24694; Y10T 428/2457; Y10T 428/24711; Y10T 428/24628; Y10T 428/24686; Y10T 428/2468; B21D 13/02; B21D 13/04; B29C 53/22; B29C 53/24; B29C 53/26; B29C 53/28; B29C 53/265; B29C 53/285

USPC .......... 428/156, 167, 174, 181–185
See application file for complete search history.

(56) References Cited

U.S. PATENT DOCUMENTS

| | | |
|---|---|---|
| 5,156,921 A | 10/1992 | Lin et al. |
| 5,543,204 A * | 8/1996 | Ray .................. B32B 3/28 428/179 |
| 7,040,364 B2 | 5/2006 | Nakakita et al. |
| 2011/0277347 A1 | 11/2011 | Monfils et al. |
| 2012/0039550 A1 | 2/2012 | MacPherson et al. |
| 2015/0322561 A1 | 11/2015 | Cai |

FOREIGN PATENT DOCUMENTS

| | | |
|---|---|---|
| JP | 2000173559 A | 6/2000 |
| JP | 2002/029212 A | 7/2000 |
| JP | 2012/171251 A | 9/2012 |
| JP | 2013/067707 A | 4/2013 |
| WO | 2012/106027 A | 8/2012 |
| WO | 2015/154881 A | 10/2015 |

OTHER PUBLICATIONS

Hohlfeld, "Unfolding the Sulcus", Physical Review Letters, vol. 106, pp. 105702.1-105702.4 (2011).
Oderkerk, et al., "Micromechanical Deformation and Recovery Processes of Nylon-6/Rubber Thermoplastic Vulcanizates as Studied by Atomic Force Microscopy and Transmission Electron Microscopy", Macromolecules, 2002, vol. 35, pp. 6623-6629.
Santangelo, "Folding Furrows", American Physical Society, vol. 4, Issue 19 (2011).
Tachi, "Freeform Rigid-Foldable Structure Using Bidirectionally Flat-Foldable Planar Quadrilateral Mesh", Advances in Architectural Geometry 2010, pp. 87-102, 2010.

* cited by examiner

Buckling

FIGURE 1a

Wrinkling/creasing

EXPANSIBLE BARRIER FILM ASSEMBLIES

PRIORITY CLAIM

This application is a National Phase Application which claims priority to and the benefit of PCT/US2015/059570, filed Nov. 6, 2015, and U.S. Provisional Application Ser. No. 62/094,699 filed Dec. 19, 2014, the disclosures of which are fully incorporated herein by their references in their entireties.

FIELD OF THE INVENTION

The present invention is directed to expansible barrier film assemblies and the method of manufacturing such barrier film assemblies. The barrier film assemblies are useful in non-linear structures, providing flexibility to the structures.

BACKGROUND OF THE INVENTION

A number of semi-crystalline thermoplastic resins, such as polyamide and ethylene vinyl alcohols (EVOH), have been incorporated into various barrier applications including tire innerliners where a relatively thin film of such semi-crystalline thermoplastic polymers are used in place of a relatively thicker layer of relatively higher permeability rubber. The use of a thin film permits the tire manufacturer to reduce the weight component of the innerliner portion of the tire and obtain higher gas impermeability characteristics for the innerliner. However, the use of thermoplastic resins as an innerliner film or in an innerliner composition for tires is problematic because thermoplastic resins containing films are relatively stiff and inelastic in comparison to the other elastomeric and reinforced elastomeric layers forming the tire; thereby producing less than optimal results when used as barrier films to provide comparable or better air or other fluid retention than the retention demonstrated by more conventional elastomeric innerliners.

Thermoplastic resins or polymers having desirable barrier properties are generally semi-crystalline and derive their impermeability from the fact that diffusing gas molecules have low solubility and low diffusion rates in the crystalline regions due to the low free volume in the crystalline regions. It has been discovered that the semi-crystalline nature of thermoplastic resin results in yielding under load, which is a dissipative mechanism that results in microstructural changes in the material, which is in contrast to a crosslinked rubber, where the deformation is essentially reversible. As a consequence, thermoplastic polymer films are subject to fatigue degradation under repeated loading or deformation which may result in premature failure of the barrier properties of a barrier layer comprising a thermoplastic film. Such failures include the formation of relatively high shear stresses between the film and underlying tire body which may subsequently delaminate over a large area resulting in reduction of air retention. This shear stress increases as the stiffness of the barrier layer increases.

Another benefit of using thermoplastic resins in a barrier layer is that comparable or improved fluid retention may be obtained along with a reduced mass relative to conventional elastomeric compounded innerliners, which may translate to improved fuel efficiency by reducing the tire mass. In addition, the higher stiffness of the thermoplastic resin in a barrier layer, which is a product of modulus and section, translates into a barrier layer capable of carrying more load relative to elastomeric innerliners. However, the higher stiffness of the thermoplastic resin, coupled with an inherent yielding behavior, which may be hysteretic or inelastic, results in higher rolling resistance which is detrimental to performance of the innerliner. It is desirable to minimize hysteresis losses in the innerliner, both to minimize rolling resistance, and to prevent or at least diminish plastic deformation within the liner, which may be a root cause of hysteresis loss leading to reduced durability in fatigue loading.

When a stiff film, such as a thermoplastic resin film, is fixed on a more compliant substrate and then placed in compression, the stiff film may buckle or crease. Similarly, when a sidewall of a tire is flexed, putting the inner layers and innermost surface in compression, a stiff innerliner film may buckle or wrinkle; see FIGS. 1a and 1b. Under such compressive deformation, a sulcus (a deep, narrow groove defined by at least one sharply angled side or sharp point of inflection at the groove bottom; the plural thereof being sulci) can form, creating a stress and strain singularity. After undergoing repeated such deformations, as may be experienced during tire rotation, cracks may initiate in the innerliner film in the locations at the sulci bases. When a crack forms in a stiff film innerliner it can lead to high shear stress concentrations at the interface with the adjacent softer elastomeric layers and may result in delamination of the film innerliner.

Another thermoplastic resin film used as innerliners in tire applications has been dynamically vulcanized alloys (DVAs), also referred to in the art as thermoplastic alloy vulcanizates (TPVs), which comprise micron-sized rubber particles dispersed in a barrier thermoplastic matrix. However, DVAs have been used as tire innerliners and other barrier applications with limited success to date. When a DVA is subjected to tensile strain the thermoplastic matrix of the DVA may undergo a permanent elongation which is not recovered when the strain is removed; resulting in buckles in the thermoplastic matrix which are compensated for by the surrounding elastomer particles [see *Micromechanical Deformation and Recovery Processes of Nylon-6/Rubber Thermoplastic Vulcanizates as Studied by Atomic Force Microscopy and Transmission Electron Microscopy*, Oderkerk et. al, Macromolecules, Vol. 35, No. 17, (2002)]. This post-strain relationship of the thermoplastic matrix and the elastomeric particles permits the DVA barrier layer to sustain large and repeated deformation without failure under limited shear strains when employed in an innerliner of a tire.

Despite the rubber/thermoplastic resin relationship, DVA innerliners may be prone to fatigue cracks which degrade the barrier properties of the layer, especially at low temperatures. In addition, the higher retraction force on DVA layers when employed as a tire innerliner are greater than those of an expanded green or uncured tire assembly comprising comparable elastic rubber innerliners, which may lead to delamination, entrapment of air, and malformations in the cured tire. In addition, sulci formed under compressive deformation of DVA-containing innerliners may also create stress and strain singularities, which may further manifest in cracking and/or delamination of the innerliner layers from the rest of the tire.

The limitations of the prior art approaches to achieving improved air barrier performance suggest a continuing need for improvements, as have been accomplished by use of the air barrier assembly, methods and compositions according to embodiments of the present invention.

SUMMARY OF THE INVENTION

Disclosed herein is a barrier layer assembly useful as a barrier component in manufactured articles. The barrier layer assembly has a support layer and a film layer bonded thereto. The assembly has an internal or external bi-directionally corrugated surface to provide flexing of the assembly during deformation.

In any aspect disclosed herein, the bi-directionally corrugated surface of the barrier layer assembly has non-sulcate furrows.

In any aspect of the invention, the bi-directionally corrugated surface of the barrier layer assembly has a three-dimensional structure arranged about a central plane comprising a first curvilinear shape oriented in a first direction along the central plane combined with a second curvilinear shape oriented in a second direction along the central plane non-parallel to the first direction. The curvilinear shapes in each direction may be the same or different from one another. The differences in curvature may be differences in depth, pitch, or spacing.

Also disclosed herein are variations in the layers of the barrier layer assembly, as well as variations in the materials forming the barrier layer assembly.

Disclosed herein are methods of manufacturing or preparing the barrier layer assembly, either before, during, or after the barrier layer assembly is inserted into an article.

BRIEF DESCRIPTION OF THE DRAWINGS

The invention will be described with assistance from the following drawings:

FIG. 10 is a side sectional view of a pair of rollers for corrugating the barrier layer assembly according to an embodiment of the invention;

FIG. 11 is a cross-sectional view of a tire; and

FIGS. 12 to 19 are hysteresis curves, load (N) vs. strain (% extension) of comparative and inventive barrier layer assemblies.

DETAILED DESCRIPTION

Various specific embodiments, versions, and examples will now be described, including embodiments and definitions that are adopted herein for purposes of understanding the instant disclosure. While the illustrative embodiments have been described with particularity, it will be understood that various other modifications will be apparent to and can be readily made by those skilled in the art without departing from the spirit and scope of the disclosure. For determining infringement, the scope of the instant disclosure will refer to any one or more of the appended claims, including their equivalents and elements or limitations that are equivalent to those that are recited.

It has been discovered that the above discussed drawbacks regarding the stress and strain of formed sulci when using a thermoplastic resin as or in a barrier layer assembly may be overcome if the thermoplastic resin based film is prepared with a three-dimensional structure, creating an extensible material useful as an air barrier such as a tire innerliner. The three-dimensional structure refers to a corrugated shape in which smoothly varying folds are oriented along a first direction, overlaid with smoothly varying folds oriented along a second direction transverse to the first direction to produce a shape or structure having smoothly varying transitions rather than being folded as planar segments between crease lines. This corrugated shape allows a thermoplastic resin to be used as a barrier layer within a barrier layer assembly, achieving higher levels of extension without high levels of strain or local concentrations of strain, such as a sulcus, in the film. This is true even when the barrier layer is an innerliner adhered to a more compliant material such as the body of the tire because the underlying rubber is less stiff and its local deformation tends to follow that of the stiffer barrier material. The net effect of smoothly varying corrugations in an innerliner is the accommodation of the relatively large deformations of the tire of about +/−10%, or 20%, or 30%, or 40%, or 50%, by a combination of flexure and local rotation of the innerliner, and a much lower level of strain in the plane of the innerliner than would be the case if the liner was not corrugated or otherwise shaped.

The film layer or a barrier layer assembly with a film layer having a modified physical structure (as opposed to a modified chemical structure or compounding) enables improved durability of the film layer when used as a barrier means in a structure that is non-linearly shaped and/or is subject to multi-dimensional deformation/flexing. The film contains a thermoplastic resin, the amount of thermoplastic resin being in the range of 20 parts by weight to 100 parts by weight.

Embodiments of the present invention are useful in barrier layer assemblies such as tire innerliners. The barrier layer films and barrier layer assemblies, comprising the thermoplastic resin having a corrugated three-dimensional structure exhibit excellent durability and impermeability to fluids such as air, as well as to liquids. Furthermore, the invention includes processes for producing pneumatic tires, bladders, hoses, and the like which employ a barrier layer assembly in accordance with any embodiment of the invention.

Definitions

Definitions applicable to the instant disclosure include the following as described herein.

Polymer may be used to refer to homopolymers, copolymers, interpolymers, terpolymers, etc. Likewise, a copolymer may refer to a polymer comprising at least two monomers, optionally with other monomers. All molecular weights are weight average unless otherwise noted.

When a polymer is referred to as comprising a monomer, the monomer is present in the polymer in the polymerized form of the monomer or in the derivative form of the monomer. However, for ease of reference, the phrase "comprising the (respective) monomer" or the like is used as shorthand. Isoolefin refers to any olefin monomer having two substitutions on the same carbon. Multiolefin refers to any monomer having two double bonds. In a preferred embodiment, the multiolefin is any monomer comprising two conjugated double bonds such as a conjugated diene like isoprene.

The term "elastomer" is used interchangeably with rubber, and refers to any polymer or composition of polymers consistent with the ASTM D1566 definition: "a material that is capable of recovering from large deformations, and can be, or already is, modified to a state in which it is essentially insoluble (but can swell) in boiling solvent . . . ". The terms may be used interchangeably with the term "rubber(s)."

The term "multiolefin" refers to any olefin monomer having two or more unsaturations (typically double bonds), for example, a multiolefin may be any monomer comprising two conjugated double bonds, such as a conjugated diene, e.g., isoprene.

The term "styrene" monomer refers to unsubstituted or substituted styrene, as further detailed below. Specifically, alkylstyrene is such substituted styrene.

The term "butyl rubber" refers to any isobutylene-based rubber, and "isobutylene-based rubber" means rubber containing at least 70 mol % isobutylene units, based on the total amount of monomer units in the rubber.

With reference to the polymers and/or elastomers referred to herein, the terms "cured," "vulcanized," or "crosslinked" refer to the chemical reaction comprising forming bonds as, for example, during chain extension, or crosslinks between polymer chains comprising the polymer or elastomer to the extent that the elastomer undergoing such a process can provide the necessary functional properties resulting from the curing reaction when the tire is put to use. For purposes of the present invention, absolute completion of such curing reactions is not required for the elastomer containing composition to be considered "cured," "vulcanized" or "crosslinked." For example, for purposes of the present invention, a tire comprising an innerliner layer composition based on the present invention is sufficiently cured when the tire of which it is a component passes the necessary product specification tests during and after manufacturing and performs satisfactorily when used on a vehicle. Furthermore, the composition is satisfactorily, sufficiently or substantially cured, vulcanized or crosslinked when the tire can be put to use even if additional curing time could produce additional crosslinks.

A vulcanized rubber compound by ASTM D1566 definition refers to "a crosslinked elastic material compounded from an elastomer, susceptible to large deformations by a small force capable of rapid, forceful recovery to approximately its original dimensions and shape upon removal of the deforming force". A cured elastomeric composition refers to any elastomeric composition that has undergone a curing process and/or comprises or is produced using an effective amount of a curative or cure package, and is a term used interchangeably with the term vulcanized rubber compound.

The term "phr" is parts per hundred rubber or "parts," and is a measure common in the art wherein components of a composition are measured relative to a total of all of the elastomer components. The total phr or parts for all rubber components, whether one, two, three, or more different rubber components is present in a given recipe is always defined as 100 phr. All other non-rubber components are ratioed against the 100 parts of rubber and are expressed in phr. This way one can easily compare, for example, the levels of curatives or filler loadings, etc., between different compositions based on the same relative proportion of rubber without the need to recalculate percent for every component after adjusting levels of only one, or more, component(s).

Alkyl refers to a paraffinic hydrocarbon group, which may be derived from an alkane by dropping one or more hydrogens from the formula, such as, for example, a methyl group (CH3), or an ethyl group (CH3CH2), and the like.

Aryl refers to a hydrocarbon group that forms a ring structure characteristic of aromatic compounds such as, for example, benzene, naphthalene, phenanthrene, anthracene, etc., and typically possess alternate double bonding ("unsaturation") within its structure. An aryl group is thus a group derived from an aromatic compound by dropping one or more hydrogens from the formula such as, for example, phenyl, or C6H5.

Substituted refers to at least one hydrogen group being replaced by at least one substituent; substituents include single molecules such as a halogen (chlorine, bromine, fluorine, or iodine), or a moiety of another chemical structure, including nitrogen, sulfur, oxygen, or carbon including moieties. For example, a "substituted styrenic unit" includes p-methylstyrene, p-ethylstyrene, etc.

Figure 1A:
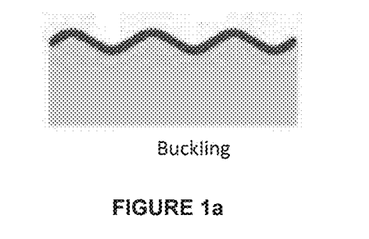
FIGS. 1a and 1b are graphical representations showing the difference between buckling and wrinkling/creasing of a laminate according to the instant disclosure.
Figure 1B:
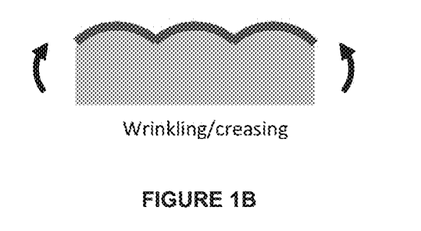

For purposes herein, buckling of layer means a relatively smooth periodic variation of curvature; wrinkling of a layer involves lines of high local curvature separated by regions of much lower and opposite curvature, as shown in FIG. 1. An extreme case of a wrinkle is a crease.

For purposes herein, oxygen permeability refers to the Mocon air permeation coefficient. The permeability test is performed according to methods known to one of skill in the art. For purposes herein, the test is performed on a MOCON OXTRAN 2/61 (Mocon, Minneapolis, Minn., USA), or an equivalent thereof. Permeability is calculated per standard methods known to one of skill in the art, e.g., as recommended by MOCON. Values are also compensated for ambient barometric pressure.

Barrier Layer Assembly

Figure 2A:
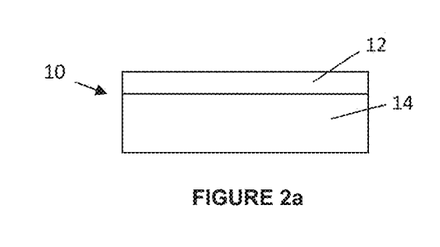
FIGS. 2a and 2b are cross-sectional views of the barrier layer assembly illustrating the possible assembly layers.
Figure 2B:
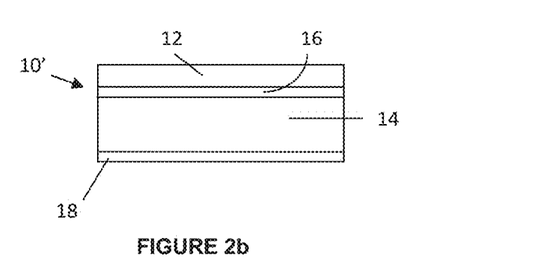

A cross-sectional illustration of the simplest embodiment of a barrier layer assembly is provided in FIG. 2a; the cross sectional view represents the assembly at a location parallel to any planar edge of the dimensional structure or of the assembly prior to formation of the expansible configuration of the assembly. At a minimum, the barrier layer assembly 10 has two layers: the barrier film layer 12 and the support layer 14. The barrier layer assembly 10' of FIG. 2b illustrates the location of optional adhesives layer 16 between the barrier film layer 12 and the support layer 14 and optional adhesive layer 18 on the surface of support layer 14 opposing the barrier film layer 12. Variations to the structure include, but are not limited to, more than one barrier film layer 12, more than one support layer 14, and optional adhesive layers between any two or all layers comprising the barrier layer assembly 10'.

Barrier Film Layer 12

Thermoplastic Film

The material useful as a barrier film layer in a barrier layer assembly or in an article contains a thermoplastic resin, the amount of thermoplastic resin being present in the film in an amount of 20 wt % to 100 wt %. The thermoplastic resin has a Young's modulus of more than 500 MPa, and/or a Mocon air permeation coefficient, also referred to herein as an oxygen permeability, of less than $25 \times 10^{-12}$ cc-cm/cm$^2$-sec-cm Hg at 30 C, and/or a melting point of about 170° C. to about 230° C.

Thermoplastic resin suitable for use include the following resin categories and exemplary resins of each category:

polyamide resins: nylon 6 (N6), nylon 66 (N66), nylon 46 (N46), nylon 11 (N11), nylon 12 (N12), nylon 6,10 (N610), nylon 6,12 (N612), nylon 6/66 copolymer (N6/66), nylon 6/66/610 (N6/66/610), nylon MXD6 (MXD6), nylon 6T (N6T), nylon 6/6T copolymer, nylon 66/PP copolymer, nylon 66/PPS copolymer;

polyester resins: polybutylene terephthalate (PBT), polyethylene terephthalate (PET), polyethylene isophthalate (PEI), PET/PEI copolymer, polyacrylate (PAR), polybutylene naphthalate (PBN), liquid crystal polyester, polyoxalkylene diimide diacid/polybutyrate terephthalate copolymer and other aromatic polyesters;

polynitrile resins: polyacrylonitrile (PAN), polymethacrylonitrile, acrylonitrile-styrene copolymers (AS), methacrylonitrile-styrene copolymers, methacrylonitrile-styrene-butadiene copolymers;

polymethacrylate resins: polymethyl methacrylate, polyethylacrylate;

polyvinyl resins: vinyl acetate (EVA), polyvinyl alcohol (PVA), vinyl alcohol/ethylene copolymer (EVOA), ethylene vinyl alcohol (EVOH), polyvinylidene chloride (PVDC), polyvinyl chloride (PVC), polyvinyl/polyvinylidene copolymer, polyvinylidene chloride/methacrylate copolymer;

cellulose resins: cellulose acetate, cellulose acetate butyrate;

fluoro or fluorine resins: polyvinylidene fluoride (PVDF), polyvinyl fluoride (PVF), polychlorofluoroethylene (PCTFE), tetrafluoroethylene/ethylene copolymer (ETFE);

aromatic polyimides;

polysulfones;

polyacetals;

polyactones;

polyphenylene oxide and polyphenylene sulfide;

aromatic polyketones;

or any mixtures of any of the above thermoplastic resins.

In preferred aspects of the invention, the film is composed of nylon 6, nylon 66, nylon 46, nylon 11, nylon 12, nylon 610, nylon 612, nylon 6/66, nylon 6/nylon 6/66/12, nylon 6/66/610, nylon MXD 6, nylon 6T, nylon 66/polypropylene copolymer, nylon 66/polystyrene copolymer, polybutylene terephthalate, polyethylene terephthalate, polyethylene isophthalate, polyarylate, polybutylene naphthalate, polyoxyalkylene diimidic acid/poly butyrate terephthalate copolymer, polyacrylonitrile, polymethacrylonitrile, acrylonitrile/styrene copolymer, methacrylonitrile/styrene copolymer, methacrylonitrile/styrene/butadiene copolymer, poly methyl methacrylate, ethyl polymethacrylate, polyvinyl acetate, polyvinyl alcohol, ethylene-vinyl alcohol copolymer, polyvinylidene chloride, polyvinyl chloride, polyvinylidene chloride, vinylidene chloride/methyl acrylate copolymer, cellulose acetate butyrate, polyvinylidene fluoride, polyvinyl fluoride, polychlorfluoroethylene, tetrafluoroethylene/ethylenic copolymer, aromatic polyimide, polystyrene, polyethylene, polypropylene, polycarbonate, polyphenylene oxide, polyoxymethylene, or combinations thereof. In more preferred aspects of the invention, the film is a blend of polyamide resins, including blends of polyamide copolymers wherein different viscosity polyamide copolymers are blended together to achieve the desired processability of the film.

When the film is comprised of less than 100 wt % of the thermoplastic resin, the thermoplastic resin is blended with conventional thermoplastic additives, such as plasticizers and antioxidants.

DVA Film

Alternatively, when the film is comprised of less than 100 wt % of the thermoplastic resin, the thermoplastic resin, with or without conventional thermoplastic additives, may be the continuous phase matrix in a thermoplastic elastomeric material. In such a thermoplastic elastomeric material, elastomer is present as a dispersed phase in the thermoplastic continuous phase. The dispersed particle size of the elastomer and the structure of the resin phase are selected to obtain the desired characteristics of the material, in regards to processability, filmability, and product performance. If the elastomer is vulcanized during melt mixing of the elastomer with the thermoplastic (as opposed to static curing that typically occurs in a rubber mold), the material may be referred to as a dynamically vulcanized alloy (DVA). DVA's suitable for use in any aspect of the invention, are disclosed in the co-assigned WO2007/050236, which is fully incorporated by reference herein.

The average elastomeric particle size for the majority of elastomeric particles in the DVA is defined by a diameter of less than 1,000 nanometers (1.0 microns), or in the range of 100 to 1,000 nanometers (0.1 microns to 1.0 microns), or 125 to 500 nanometers in any embodiment of the invention, or 125 to 400 nanometers in any embodiment of the invention.

The elastomeric component of the DVA may be selected from an assortment of thermosetting, elastomeric materials. For uses where impermeability of the final article to be produced is desired, the use of at least one low-permeability elastomer is desired.

Useful are elastomers derived from a mixture of monomers, the mixture having at least the following monomers: a C4 to C7 isoolefin monomer and a polymerizable monomer. In such mixtures, the isoolefin is present in a range from 70 to 99.5 wt % of the total monomers in any embodiment, or 85 to 99.5 wt % in any embodiment. The polymerizable monomer is present in amounts in the range of from 30 to about 0.5 wt % in any embodiment, or from 15 to 0.5 wt % in any embodiment, or from 8 to 0.5 wt % in any embodiment. The elastomer will contain monomer derived unit amounts having the same weight percentages.

The isoolefin is a C4 to C7 compound, non-limiting examples of which are compounds such as isobutylene, isobutene, 2-methyl-1-butene, 3-methyl-1-butene, 2-methyl-2-butene, 1-butene, 2-butene, methyl vinyl ether, indene, vinyltrimethylsilane, hexene, and 4-methyl-1-pentene. The polymerizable monomer may be a C4 to C14 multiolefin such as isoprene, butadiene, 2,3-dimethyl-1,3-butadiene, myrcene, 6,6-dimethyl-fulvene, hexadiene, cyclopentadiene, and piperylene. Other polymerizable monomers such as styrene, alkylstyrene e.g., p-methylstyrene, and dichlorostyrene are also suitable for preparing a useful elastomer.

Elastomers useful in the practice of this invention include isobutylene-based copolymers. An isobutylene based elastomer or a polymer refers to an elastomer or a polymer comprising at least 70 mol % repeat units from isobutylene and at least one other polymerizable unit. The isobutylene-based copolymer may or may not be halogenated. The elastomer may be a butyl-type rubber or branched butyl-type rubber, especially halogenated versions of these elastomers. Useful elastomers are unsaturated butyl rubbers such copolymers of olefins or isoolefins and multiolefins. Non-limiting examples of unsaturated elastomers useful in a DVA formed into a film for use in the present invention are poly(isobutylene-co-isoprene), polyisoprene, polybutadiene, polyisobutylene, poly(styrene-co-butadiene), natural rubber, star-branched butyl rubber, and mixtures thereof. Butyl rubber is obtained by reacting isobutylene with 0.5 to 8 wt % isoprene, or reacting isobutylene with 0.5 wt % to 5.0 wt % isoprene—the remaining weight percent of the polymer being derived from isobutylene; the butyl rubber contains monomer derived unit amounts having the same weight percentages.

Elastomeric compositions used in the DVA may also comprise at least one random copolymer comprising a C4 to C7 isoolefin and an alkylstyrene comonomer. The isoolefin may be selected from any of the above listed C4 to C7 isoolefin monomers, and is preferably an isomonoolefin, and in any embodiment may be isobutylene. The alkylstyrene may be para-methylstyrene, containing at least 80%, more alternatively at least 90% by weight of the para-isomer. The random copolymer may, optionally, include functionalized interpolymers. The functionalized interpolymers have at least one or more of the alkyl substituents groups present in the styrene monomer units; the substituent group may be a benzylic halogen or some other functional group. In any embodiment, the polymer may be a random elastomeric copolymer of a C4 to C7 α-olefin and an alkylstyrene comonomer.

Preferred elastomers include copolymers of isobutylene and para-alkylstyrene, which may or may not be halogenated. Preferably the copolymer of isobutylene and para-alkylstyrene is halogenated. Such elastomers are described in EP Application 0 344 021. The copolymers have a substantially homogeneous compositional distribution. Preferred alkyl groups for the para-alkylstyrene moiety include alkyl groups having from 1 to 5 carbon atoms, primary haloalkyl, secondary haloalkyl having from 1 to 5 carbon atoms and mixtures thereof. A preferred copolymer comprises isobutylene and para-methylstyrene. Brominated copolymers of isobutylene and para-methylstyrene include those having 5 to 12 weight % para-methylstyrene, 0.3 to 1.8 mol % brominated para-methylstyrene, and a Mooney viscosity of 30 to 65 (1+4) at 125° C. (as measured by ASTM D 1646-99).

In the DVA, the thermoplastic resin is present in an amount ranging from about 20 to 95 wt % based on the alloy blend or 35 to 90 wt %. The amount of elastomer in the DVA is in an amount ranging from about 5 to 80 wt % based on the alloy blend or 10 to 65 wt %. In the invention, the thermoplastic resin is present in the alloy, relative to the amount of elastomer, in an amount in the range of 40 to 80 phr.

Other materials may be blended into a DVA to assist with preparation of the DVA or to provide desired physical properties to the DVA. Such additional materials include, but are not limited to, curatives, stabilizers, compatibilizers, reactive plasticizers, non-reactive plasticizers, extenders and polyamide oligomers or low molecular weight polyamide and other lubricants as described in U.S. Pat. No. 8,021,730 B2.

Support Layer 14

The barrier layer assembly is formed of barrier film layer 12 of any of the above discussed thermoplastic resin containing materials, and at least one support layer 14. When the intended use of the barrier layer assembly is in an article subjected to flexing or must have elastic properties, the support layer 14 is preferably formed from an elastomeric composition. If the barrier layer assembly has multiple support layers 14, either adjacent or on opposing sides of the barrier film layer 12, the support layers 14 may have the same or different compositions/compound formulations.

In accordance with any embodiment of the invention, the support layer 14 is an elastomeric composition and may hereinafter be referred to as the elastomeric layer. The primary elastomeric polymer of at least one elastomeric layer in the barrier assembly may be selected for its impermeability characteristics, such as any of the C4 to C7 isoolefin based polymers or isobutylene based polymers discussed above, or for other characteristics such as durability, flexibility, heat resistance, processability, adhesion/tackiness, or dampening. Such other suitable polymers for preparing elastomeric compositions for the barrier assembly include high diene polymers and their hydrates.

High diene content elastomers are also referred to as high diene monomer rubber. It is typically a rubber comprising at least 50 mole % of a C4 to C12 diene monomer, typically at least about 60 mole % to about 100 mole %; more preferably at least about 70 mole % to about 100 mole %; more preferably at least about 80 mole % to about 100 mole %. Useful high diene monomer rubbers include homopolymers and copolymers of olefins or isoolefins and multiolefins, or homopolymers of multiolefins. Examples of such polymers/rubbers, either as the primary elastomer or in a rubber blend to form the elastomeric layer of the barrier assembly, include polyisoprene, polybutadiene rubber, (including high cis BR and low cis BR), styrene butadiene rubber (SBR), hydrogenated SBR, natural rubber, epoxylated natural rubber, chloroprene rubber, acrylonitrile butadiene rubber, nitrile butadiene rubber (NBR), hydrogenated NBR, ethylene propylene rubbers (including both EPDM and EPM), maleic acid-modified ethylene propylene rubbers (M-EPM), acrylic rubbers (ACM), ionomers, halogen containing rubbers such as chloroprene rubbers (CR), hydrin rubbers (CHR), chlorosulfonated polyethylenes (CSM), chlorinated polyethylenes (CM), maleic acid modified chlorinated polyethylenes (M-CM), silicone rubbers (for example, methylvinyl silicone rubbers, dimethyl silicone rubbers, methylphenylvinyl silicone rubbers), sulfur containing rubbers (for example, polysulfide rubbers), fluoro rubbers (for example, vinylidene fluoride rubbers, fluorine containing vinyl ether-based rubbers, tetrafluoroethylene-propylene rubbers, fluorine-containing silicone rubbers, fluorine containing phosphagen rubbers), and their mixtures.

The elastomer may comprise functionalized rubbers exhibiting low glass transition temperatures, Tg, preferably less than 30° C. The low Tg contributes to reduced modulus (enhanced softness) of the rubber at operating or use temperatures of products containing such rubbers, for example, tire innerliners, of about 20° C. or less. Suitable functionality includes maleic anhydride, acyllactam, or others that can readily react with amine functionality present in polyamides.

In embodiments of the invention, the elastomeric layer of the barrier layer assembly comprises butyl rubber, natural rubber, polyisoprene rubber, epoxidized natural rubber, styrene butadiene rubber, hydrogenated styrene butadiene rubber, butadiene rubber, hydrogenated butadiene rubber, star-branched butyl rubber, acrylic nitrile butadiene rubber, hydrogenated acrylic nitrile butadiene rubber, ethylene propylene rubber, ethylene propylene diene rubber, maleic acid-maleic anhydride grafted ethylene propylene rubber, ethylene-glycidyl methacrylate copolymer, maleic anhydride grafted ethyl acrylate copolymer, isobutylene-isoprene rubber, isobutylene-acrylic rubber, brominated butyl rubber, chlorinated butyl rubber, brominated isobutylene-p-methylstyrene copolymer, brominated isobutylene-isoprene rubber, chloroprene rubber, hydrin rubber, chlorosulfonated polyethylene, chlorinated polyethylene, maleic acid grafted chlorinated polyethylene, silicone rubber, halogenated silicone rubber, methylvinyl silicone rubber, dimethyl silicone rubber, methylphenyl vinyl silicone rubber, polysulfide rubber, vinylidene fluoride rubber, halogenated vinyl ether rubber, or combinations thereof.

Adhesive Layer(s)

In an aspect of the invention, the barrier layer assembly may include an adhesive layer. Locations of an adhesive layer include: a) between the barrier film layer and the support layer to assist in adhering the layers, b) on the opposite side of the support layer from the barrier film layer to provide tack to an unvulcanized diene-based rubber or the like to assist in tacking an innerliner comprising the barrier layer assembly onto an inner surface of an uncured or green tire, and c) on both sides of the support layer, i.e., in both of the prior noted locations. The adhesive composition selected may be dependent on the location of the adhesive layer and the material intended for lamination via the adhesive layer.

The adhesive layer may have a base polymer of thermoplastic or elastomer and may contain a tackifier if the base polymer does not provide sufficient tack. Suitable polymers for the adhesive composition include any of various styrene-butadiene-based block copolymers (SBS), various styrene-isoprene block (SIS) copolymers, and their partial hydrogenates, including mixtures and combinations thereof, and the like. In an embodiment, the adhesive composition may comprise an epoxy-modified, i.e., epoxylated SBS (ESBS) having an oxirane oxygen functionality. This epoxy modification may be carried out by epoxylating, for example, a styrene-butadiene-based block copolymer (SBS) using peracids, hydroperoxides or the like. As peracids, performic acid, peracetic acid, perbenzoic acid, trifluoroperacetic acid, etc., may be mentioned. Further, as hydroperoxides, hydrogen peroxide, t-butyl hydroperoxide, cumene peroxide, etc., may be mentioned. If the oxirane oxygen content of the ESBS thus obtained is too low, the bondability of the sublayer with the thermoplastic elastomer layer is liable to deteriorate, and therefore, this is not preferred, while conversely if it is too high in the adhesive outer layer, the bondability with the tire rubber is liable to deteriorate, and therefore, this is not preferred.

When used between the thermoplastic containing barrier film layer and the elastomeric layer of the barrier layer assembly, the adhesive composition may comprise ESBS with an oxirane oxygen content effective to bond with the thermoplastic containing barrier film layer. The adhesive composition may comprise a total of 100 parts by weight of a thermoplastic elastomer wherein the thermoplastic elastomer contains at least 50 parts by weight of the ESBS, preferably 60 to 100 parts by weight, so that an oxirane oxygen content becomes 1 to 5% or 1 to 3% by weight, preferably 1.2 to 2.8% by weight, by weight of the layer or sublayer. Examplary adhesives of this type are disclosed in WO2008/004998.

When used on the opposite side of the elastomeric layer for bonding the barrier layer assembly to another elastomeric layer, the adhesive composition may comprise a curing agent in an amount effective for co-curing with a diene rubber with which it is placed in contact, e.g., in the adhesion of the barrier layer assembly as an innerliner onto the inner surface of a tire carcass.

Alternatively, the adhesive composition may comprise a resorcinol-formaldehyde resin and rubber latex composition, known in the art as RFL. The RFL composition may be used alone, or in combination with other adhesives, tackifiers, adjuvants, and the like.

Another useful adhesive composition is an aqueous composition. In an embodiment, the adhesive composition may comprise a polyethyleneimine polymer, preferably a polyethyleneimine that has been chemically modified or functionalized. Examples include Mica H760 and H760A, (available from Mica Corporation, Shelton, Conn.) Epomin P1050 (available from Nippon Shokubai), and the like. Polyethyleneimine polymers preferably include from 5 to 50 wt % tertiary amine functionality, from 5 to 75 wt % secondary amine functionality, and from 5 to 50 wt % primary amine functionality. For purposes herein, polyethyleneimine polymers are considered to be amino-functional polymers. Also suitable aqueous based adhesives include low molecular weight maleated butadiene (commercially available as Ricobond 7002 and 7004 series from Cray Valley HSC, USA), latexes of low molecular weight styrene butadiene (commercially available as Pliocord SB 2108), and latexes of vinyl pyridine (commercially available as Pliocord VP 106S from Omnova). The non-latex form of these materials may also be useful in the adhesive composition.

The adhesive composition may comprise a cationically stabilizable amino-functional polymer having a number-average molecular weight of >3000, which exists in the presence of water as a solution or stable emulsion only when the pH is <=8, and which upon drying contains ethenically unsaturated moieties selected from the group consisting of acrylic, methacrylic, and enamine. The amino-functional polymer may include at least one additional polymer selected from the group consisting of nonionic polymer and cationic polymer. In an embodiment, adhesive composition may include an aqueous composition comprising ethenically unsaturated moieties selected from the group consisting of acrylic, methacrylic, and enamine, wherein the adhesive coating composition comprises 70 to 99 wt. % of an amino-functional polymer and 1 to 30 wt. % of an unsaturation enhancer element.

The adhesive composition comprising an amino-functional polymer may be a condensation product of a reaction between an amino-functional polymer comprising reactive amine hydrogens with a functionalizing agent or element selected from the group consisting of halo-functional monomer, halo-functional oligomer, carbonyl-functional monomer, carbonyl-functional oligomer, epoxy-functional monomer, epoxy-functional oligomer, poly-functional acrylic monomer, poly-functional acrylic oligomer, poly-functional methacrylic monomer, and poly-functional methacrylic oligomer, said functionalizing agent containing or forming upon drying an ethenically unsaturated moiety selected from the group consisting of acrylic, methacrylic, and enamine. Functionalizing agents include 2-hydroxy-3-chloropropylacrylate, glycidyl methacrylate (GMA), glycidyl acrylate, and acetoacetoxyethyl methacrylate (AAEM).

The adhesive composition may contain or be a chemically modified polyethylene imine polymers modified through condensation reactions with ethenically unsaturated moieties selected from the group consisting of acrylic, methacrylic, and enamine, preferably 2-hydroxy-3-chloropropylacrylate, glycidyl methacrylate (GMA), glycidyl acrylate, acetoacetoxyethyl methacrylate (AAEM), or a combination thereof.

Additives

In preparing either the composition of the elastomeric layer of the barrier layer assembly or the adhesive composition for between the layers of the barrier layer assembly or external to the elastomeric layer of the barrier layer assembly for adhesion to another material, the composition may include components typically found in conventional elastomeric based compositions. Such additional components include fillers, curatives, processing aids, and anti-oxidants.

Useful fillers in the elastomeric and adhesive compositions include calcium carbonate, clay, mica, silica and silicates, talc, titanium dioxide, starch and other organic fillers such as wood flour, and carbon black. Suitable filler materials include carbon black such as channel black, furnace black, thermal black, acetylene black, lamp black, modified carbon black such as silica treated or silica coated carbon black, and the like. Reinforcing grade carbon black is preferred. A particularly useful grade of carbon black is Mitsubishi Carbon Black grade MA600, also identified as a medium color furnace black. Carbon black use in the elastomeric layer is in the range of 20 to 100 parts per hundred of rubber (phr); or 25 to 80 phr, or 40 to 80 phr. Carbon black use in any of the adhesive layers will be based on the type of adhesive base used—emulsion or latex adhesives may have none or a relatively low amount of carbon black in the range of 1 to 50 wt %, or 0.5 to 25 phr. If the adhesive base is a higher molecular weight polymers, such as SBS, the carbon black content may be comparable to that used in the elastomeric layer.

For curing the polymers in the elastomeric layer and adhesives (if necessary), combinations of curatives, cure modifiers, and possible accelerators may be used. The curing agent(s), with or without the use of at least one accelerator, is often referred to in the art as a curing "system" for the elastomer(s). A cure system is used because typically more than one curing agent is employed for beneficial effects. The mechanism for accelerated vulcanization of rubber involves complex interactions between the curative, accelerator, activators and polymers. Ideally, all of the available curative is consumed in the formation of effective crosslinks which join individual polymer chains to one another and enhance the overall strength of the polymer matrix.

Common curatives that can function in the present invention include metal oxides and sulfur donors. Known useful metal oxides include $ZnO$, $CaO$, $MgO$, $Al_2O_3$, $CrO_3$, $FeO$, $Fe_2O_3$, and $NiO$. Sulfur donors include powdered sulfur, precipitated sulfur, high dispersion sulfur, surface-treated sulfur, insoluble sulfur, dimorpholinedisulfide, alkylphenoldisulfide, and mixtures thereof. Metal oxides can be used in conjunction with the corresponding metal stearate complex (e.g., the stearate salts of Zn, Ca, Mg, and Al), or with stearic acid, and either a sulfur compound or an alkylperoxide compound. [See also, Formulation Design and Curing Characteristics of NBR Mixes for Seals, RUBBER WORLD 25-30 (1993)]. Curative accelerators include: amines, guanidines, thioureas, thiazoles, thiurams, sulfenamides, sulfenimides, thiocarbamates, xanthates, and the like. Known common specific accelerators include, but are not limited to, the following: stearic acid, diphenyl guanidine (DPG), tetramethylthiuram disulfide (TMTD), 4,4'-dithiodimorpholine (DTDM), tetrabutylthiuram disulfide (TBTD), 2,2'-benzothiazyl disulfide (MBTS), hexamethylene-1,6-bisthiosulfate disodium salt dihydrate, 2-(morpholinothio) benzothiazole (MBS or MOR), compositions of 90% MOR and 10% MBTS (MOR90), N-tertiarybutyl-2-benzothiazole sulfenamide (TBBS), and N-oxydiethylene thiocarbamyl-N-oxydiethylene sulfonamide (OTOS), zinc 2-ethyl hexanoate (ZEH), and N,N'-diethyl thiourea.

At least one curing agent is typically present at about 0.1 to about 15 phr; alternatively at about 0.5 to about 10 phr. Sulfur vulcanization agents may be used in an amount of about 0.5 phr to about 4 phr. If desired or necessary, one or more of a vulcanization accelerator may be added in amounts of about 0.1 phr to about 5 phr. Useful levels for specific curing agents, cure modifiers and useful levels include zinc oxide and/or zinc stearate at about 0.05 phr to about 5 phr, stearic acid at about 0.1 phr to about 5 phr, magnesium oxide at about 0.5 phr to about 4 phr, lyserge at 10 to 20 phr, p-quinonedioxime, p-dibenzoylquinonedioxime, tetrachloro-p-benzoquinone, or poly-p-dinitrosobenzene at about 0.5 phr to about 10 phr, and methylenedianiline at about 0.05 phr to about 10 phr.

Exemplary anti-oxidants include alkylated phenols, hindered phenols, and phenol derivatives, such as t-butyl hydroquinone, butylated hydroxyanisole, polybutylated bisphenol, butylated hydroxy toluene (BHT), alkylated hydroquinone, 2,6-di-tert-butyl-paracresol, 2,5-di-tert-aryl hydroquinone, octadecyl-3-(3,5-di-tert-butyl-4-hydroxy phenyl), tetrakis-(methylene-(3,5-di-(tert)-butyl-4-hydrocinnamate)) methane (IRGANOX 1010), etc. Examples of hindered phenolic antioxidants are commercially available under the IRGANOX series of trade designations including IRGANOX 565, IRGANOX 1010, IRGANOX 3052, and IRGANOX 1076 from BASF (New Jersey, USA). In one embodiment, the adhesive composition comprises from 0.01 to 3 wt % of total antioxidant on an active or neat basis (excluding inerts in as-received commercially available antioxidant packages, and including any antioxidant in the blend components such as SBS), preferably from 0.05 to 2 wt %.

As noted above, a process or plasticizer oil may be present in the compositions. Such oils are primarily used to improve the processing of the composition during preparation of the layer, e.g., mixing, calendering, etc. Generally, the process oil may be selected from paraffinic oils, aromatic oils, naphthenic oils, and polybutene oils. Rubber process oils also have ASTM designations depending on whether they fall into the class of paraffinic, naphthenic or aromatic hydrocarbonaceous process oils. The type of process oil utilized will be that customarily used in conjunction with a type of elastomer component and a skilled rubber chemist will recognize which type of oil should be utilized with a particular rubber in a particular application. For a thermoplastic elastomer composition the oil may be present at a level of 0 to about 20 wt % of the total composition; preferably oil is not included in order to maximize impermeability of the composition.

Formation of the Barrier Layer Assembly

The film layer 12 of the barrier layer assembly is initially formed by casting or extruding the thermoplastic resin containing film using conventional or known thermoplastic film forming methods. Formation of DVA film is disclosed in U.S. Provisional Application 60/005,226, filed May 30, 2014. The film layer 12 has a thickness in the range of 0.01 mm to 1.00 mm, or 0.01 to 0.75 mm, or 0.10 to 0.75 mm.

Formation of the support layer 14 is accomplished using conventional methods based upon the type of material used for the support layer 14. When the support layer 14 is an elastomeric layer, the components forming the elastomeric compositions are mixed together, generally in a Banbury™ mixer in a two-stage mixing process wherein the elastomer is not cured during mixing, and then extruded into a sheet of preferred thickness. The extruded elastomeric has an average thickness of about 2 mm or less, or about 1.0 mm or less, or in the range of 0.2 to about 1.5 mm, or 0.2 mm to about 0.8 mm.

If used, the thickness of the adhesive layer 16 is up to 600 microns, or from about 5 to 200 microns, or from about 5 to 100 microns, or from about 5 to 80 microns, or from about 5 to 70 microns, or from 10 to 50 microns.

Due to the millimeter thickness of the thermoplastic resin based film layer 12 (as discussed above), for ease of incorporating and maintaining the bi-directionally corrugated surface of the film layer 12, prior to creation of the corrugations (discussed below) in the film layer 12, the individual layers of the barrier layer assembly are preferably combined by conventional assembly techniques. Conventional assembly techniques for the pre-corrugated assembly include co-extrusion of the thermoplastic resin based layer and adhesive, or adhesion by other coating means; see US Patent Application 2012/0232210. At a minimum, prior to the creation of any corrugations in the film layer 12, the film layer 12 and the support layer 14 are pre-assembled, with or without the inclusion of the adhesive layer 16.

In any embodiments, the barrier layer assembly may further comprise a gel-like layer of sealant material to provide puncture resistance. Such a material would be preferable to stiffer cured rubber because it would interfere less with the extensible action of the shaped barrier layer.

Barrier Layer Assembly Configuration

Figure 3:
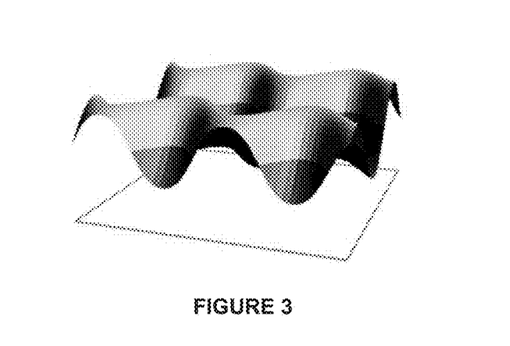
FIGS. 3 and 4 are graphical representations of a three-dimensional surface of a barrier layer according to the invention.
Figure 4:
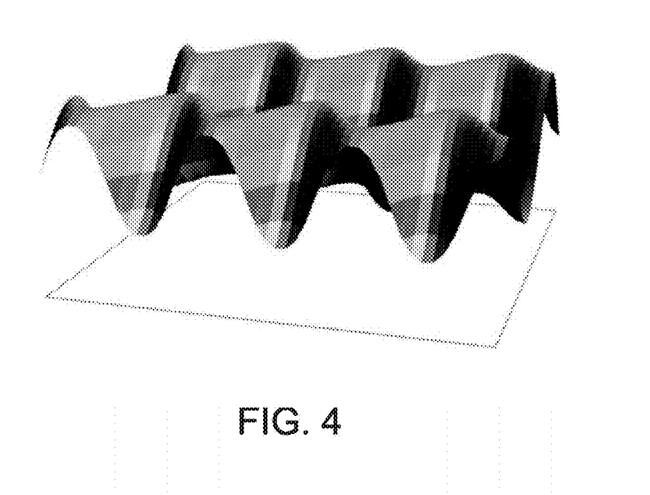

The inventive barrier layer assembly has the film layer corrugated in at least two directions, i.e., bi-directionally corrugated, in a smoothly varying manner both normal to and in the plane of the barrier layer assembly creating a three-dimensional structure arranged about a central plane, see FIGS. 3 and 4. The bi-directional corrugation enables the assembly to accommodate the large flexure deformations of the assembly with less strain in the film layer of the assembly than would be the case for a film layer without such corrugations. In this way strain can largely be kept below the elastic limit of the film, below the failure strain of the film, and without the formation of sulci. The hysteresis loss in the barrier layer is also reduced, resulting in lower rolling resistance and better durability overall.

The bi-directional corrugations of the film layer in the barrier layer assembly form non-sulcate furrows, wherein non-sulcate furrows are furrows that have sloping sides with smoothly curving peaks and valleys. These furrows are in opposition to the sulcates formed by compressive deformation of a flat thermoplastic film. The corrugations may also be described as a first curvilinear shape oriented in a first direction along a central plane combined with a second curvilinear shape oriented in a second direction non-parallel to the first direction. The curvilinear shape in each direction may be the same or vary in regards to the period and/or amplitude of the shape.

In one embodiment of the invention, the barrier layer assembly comprises at least one layer having a three-dimensional structure arranged about a central plane comprising a first essentially sinusoidal shape oriented in a first direction along the central plane combined with a second essentially sinusoidal shape oriented in a second direction along the central plane transverse to the first direction. The sinusoidal shape refers to a shape which generally approximates a sine curve, having a magnitude that varies as the sine of an independent variable, which is a mathematical curve that describes a smooth repetitive oscillation of peaks and valleys about a central line in two dimensions and about a central plane in three dimensions. The amplitude of the sinusoidal shape is the distance between the central plane and the curve, which for purposes herein is a plane parallel to an upper surface of the shape located at half the depth of the grooves, and the period is the linear distance between the apexes of adjacent peaks (or adjacent valleys). The three-dimensional structure of the barrier layer assembly may be represented by, or may approximate the equation:

$$z=a(\sin(bx)+\sin(cy))$$

where z is the distance in the direction normal to a central plane of the barrier layer assembly, x is a distance in a first direction along a length of the central plane, and y is the distance in a second direction orthogonal to the first direction and orthogonal to the central plane along the width of the central plane. The constants a, b, and c scale the amplitude in the z direction and periods in the x and y directions respectively to allow the deformations of the barrier layer assembly to accommodate large flexure of the barrier film and the values thereof depend on the desired depth and size of the corrugations and the thickness of the barrier layer assembly.

When forming the barrier layer assembly for use in a tire wherein the layers have the thickness discussed above, each constant, a, b, and c, has a value greater than zero but not more than 10 mm, alternatively in the range of 0.5 mm to 2.5 mm. The values of the three constants may vary or be equal; for FIG. 3 the values of b and c are equal and for FIG. 4 the value of b is twice the value of c, resulting in relatively deeper furrows in the z direction. Alternatively, the values may be expressed as the following ratios: $0.1a<b<10a$ and $0.1\ b<c<10b$.

In any embodiment of the invention, the depth of the corrugations of the three-dimensional shape of the barrier layer assembly 10 may be minimized in order to reduce the mass of the support layer 14 that is or will be incorporated into the corrugations, while still being large enough in relation to the thickness of the barrier layer assembly to allow it to deform as an extensible innerliner as described above.

In embodiments of the invention, the depth of the corrugations of the three-dimensional shape of the barrier layer assembly 10 may be minimized in order to reduce the mass of the support layer material 14 within the corrugations (i.e., the material between the innerliner and the plane that just contacts the valleys of the corrugations), while still being large enough in relation to the thickness of the barrier layer assembly 10 to allow it to deform as an extensible structure as previously described. Following deformation of the barrier layer assembly, in either tension or compression or alternating tension and compression cycles, sulci are not formed in the surface of the barrier layer assembly.

In any embodiment, the barrier layer assembly had a lower load at an extension of 0.1 determined according to ASTM D790 or an equivalent thereof (the extension is the increase in length divided by the original length and is thus a dimensionless unit), which is less than the load at an extension of 0.1 of a comparative barrier layer assembly which does not comprise the three-dimensional structure, i.e., a barrier layer assembly comprising the same components in the same proportions and/or having essentially the same barrier layer properties, but which does not include the three-dimensional structure according to embodiments of the invention herein.

In any embodiment of the invention, the corrugations of the barrier layer assembly may be designed to accommodate typical and local deformations expected in each area of the article into which the barrier layer assembly is to be used or incorporated, which may include varying the period of corrugations in each principal direction, the orientation of the various directions, the amplitude or relative scale of the sinusoidal shapes, and the like. For example, if the barrier layer assembly is to be incorporated into a tire, the location and the shape (i.e., the design of the corrugations) may be varied with respect to the location of the barrier layer assembly in the tire or other final article so as to provide only the minimum necessary amount of extensible action, thereby minimizing weight and maximizing barrier layer performance. For example, a tire tread area is subject to less deformation than the sidewall and shoulder areas of a tire and a barrier layer assembly innerliner may be provided wherein only those portions of the assembly innerliner corresponding to high deformation areas may be provided with the inventive bi-directional corrugations. Conversely stated, some areas of the full width of the innerliner assembly may not be provided with bi-directional corrugations.

The three-dimensional structure is fixed in the barrier layer by impressing or otherwise forming the structure into the assembly layer. It will be understood by those in the molding arts that the formation of a mold or other forming device used to impart the three-dimensional structure into the barrier film is limited to the tolerances and other factors which produce a first smoothly varying shape and a second smoothly varying shape into the assembly, both of which approximate a curve within the limits of manufacturing and machining readily understood by one having minimal skill in the art. The first shape and the second shape of embodiments of the invention are understood to approximate a first "shape" and a second "shape," which would connote an exact representation of the curved shape oriented in a first direction along a central plane combined with a second curved shape oriented in a second direction along the central plane transverse to the first direction.

Figure 5:
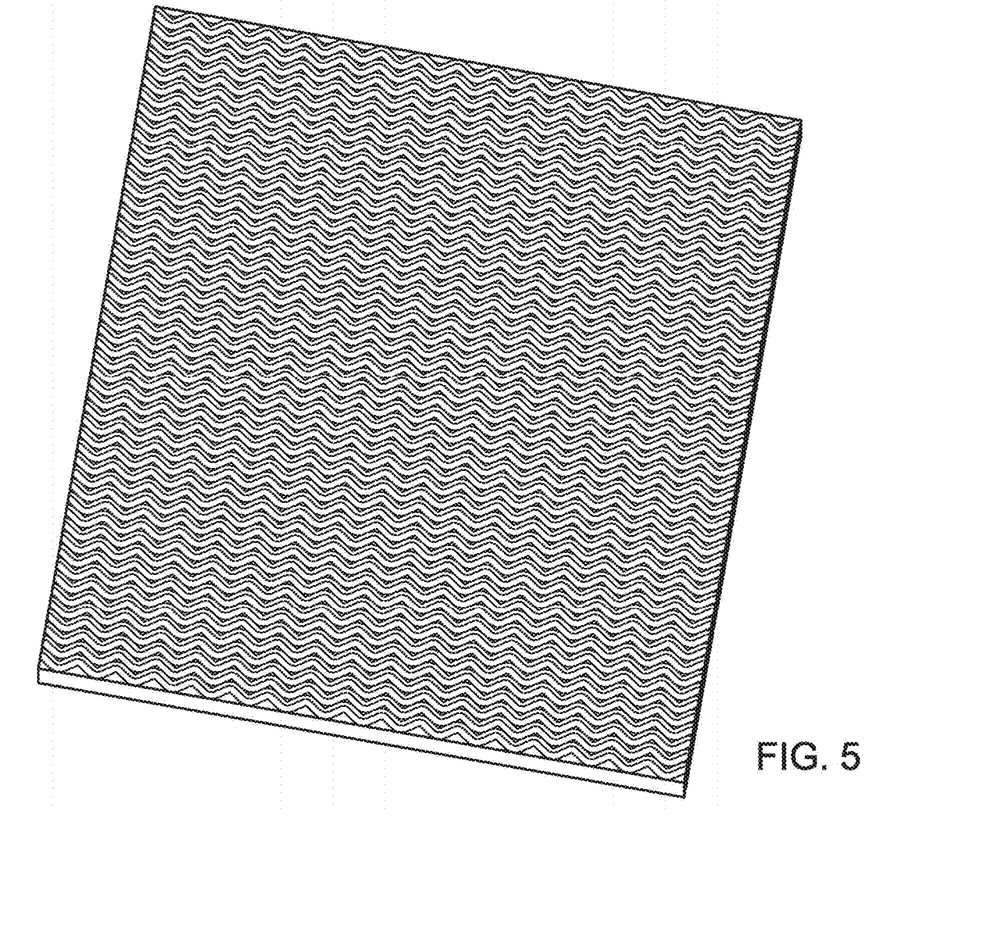
FIG. 5 is a photograph of a bi-directionally corrugated mold plate.

By way of example, and not limitation, exemplary barrier layer assemblies were prepared in a mold using at least one plate into which a shape was disposed comprising a first sinusoidal shape oriented in a first direction along the central plane combined with a second sinusoidal shape oriented in a second direction along the central plane transverse to the first direction. These shapes were machined into the surface of the planar mold using a conical cutter that was moved along a repeated sinusoidal tool path at a constant depth across the plate. The axis of rotation of the cutter was perpendicular to the surface. FIG. 5 shows a grooved mold plate prepared with nominally 2 mm groove depths. For this geometry of corrugations, the surface area is greater by approximately a factor of root two (1.4) compared to a flat plane film. In forming the shaped barrier layer assembly, the laminate comprising the barrier film and at least one support layer are subject to molding against the illustrated mold plate at a temperature and pressure, and for a period of time sufficient to impart the desired three-dimensional structure onto and into the barrier layer assembly.

Figure 6:
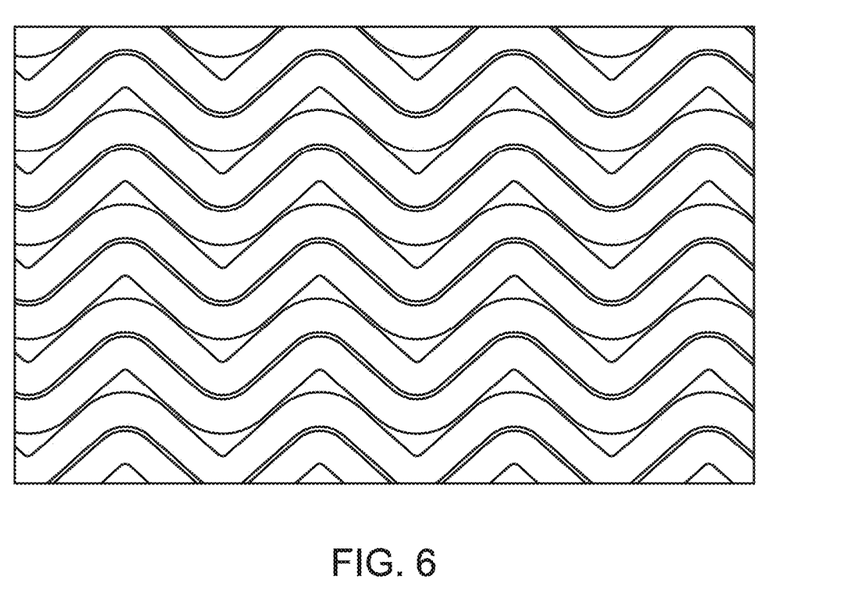
FIG. 6 is a photograph of a laminate made with the corrugated mold plate of FIG. 5 having a nylon film loaded parallel to the valley direction, after two loading cycles.
Figure 7:
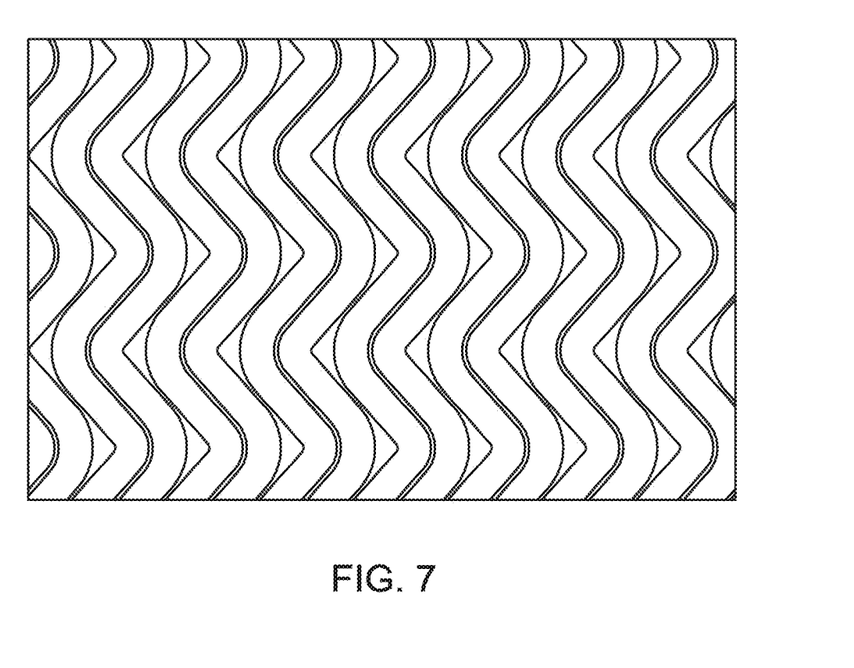
FIG. 7 is a photograph of a laminate made with the corrugated mold plate of FIG. 5 having a nylon film loaded at 90 degrees with respect to the valley direction, after two loading cycles.
Figure 8:
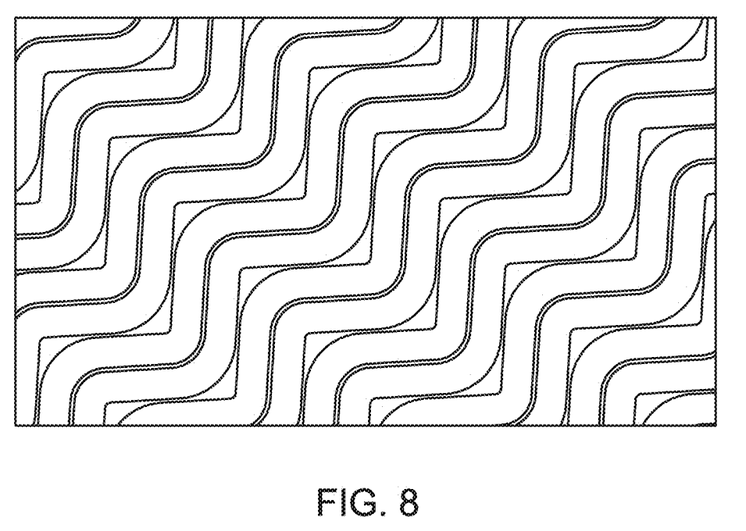
FIG. 8 is a photograph of a laminate made with the corrugated mold plate of FIG. 5 having a nylon film loaded at 45 degrees with respect to the valley direction, after two loading cycles.

FIGS. 6, 7, and 8 show a barrier layer assembly made using the plate of FIG. 5, wherein the barrier layer assembly has been deformed through two loading cycles in various directions to simulate deformation in applied applications such as a tire innerliner. The barrier layer assembly of FIGS. 6 and 7 were stretched/deformed in two loading cycles in a horizontal direction relative to the shown assembly; thus for the laminate of FIG. 6, loading/deformation was parallel to the valley/crest direction and for the laminate of FIG. 7, loading/deformation was ninety degrees relative to the valley/crest direction. The barrier layer assembly of FIG. 8 was deformed along a forty-five degree angle relative to the valley/crest direction of the laminate.

Figure 9:
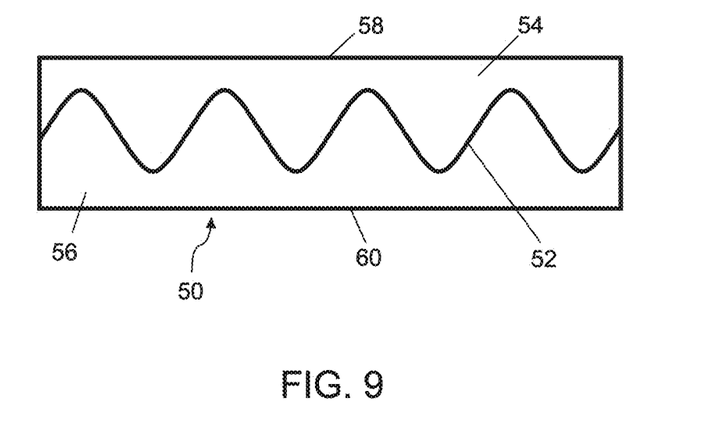
FIG. 9 is a side sectional view of a bi-directionally corrugated barrier assembly according to one embodiment of the invention.

The construction of the barrier layer assembly may be envisaged as having alternative constructions and assembly preparations. FIG. 9 shows an embodiment of an assembly 50 wherein a bi-directionally corrugated barrier layer 52 is sandwiched between two support layers 54, 56 with each support layer having flat planar outer surfaces 58, 60; thus, it is the interior surface of the assembly that is bi-directionally corrugated. For such an embodiment, the support layer should be of a sufficient extensible material to permit deformation of the assembly 50. In such an embodiment, the different support layers 54, 56 may be prepared using the same or different materials.

FIG. 10 illustrates an alternative manufacturing method. The bi-directionally corrugated surface in the barrier layer assembly may be formed by directing an unshaped barrier layer 70 assembly between at least two rollers 72, 74, wherein at least one roller 72 has a textured surface 76 sufficient to impart the bi-directionally corrugation onto the barrier layer assembly. The surface 78 of the second roller 74 is illustrated as smooth, but may have a surface textured similar or different than surface 76. In passing through the rollers 72, 74, the barrier layer assembly 70 is subject to a temperature, pressure, and for a period of time sufficient to impart the desired bi-directionally corrugated three-dimensional structure into at least a portion of the barrier layer assembly 70. The barrier layer assembly 70 may be heated or otherwise conditioned prior to being directed between rollers 72, 74. The rollers 72, 74 may also be heated or cooled to impart and form the bi-directionally corrugated barrier layer. Following formation of the desired configuration, the temperature of the barrier layer assembly is reduced for cooling of the assembly.

As noted, the barrier film layer of the barrier layer assembly is selected for its impermeability characteristics and when a DVA is selected for use as the barrier film layer material, the barrier layer assembly is suitable for use as an innerliner for a pneumatic tire. The assembly is used as an alternative to conventional natural rubber and/or halobutyl based elastomeric layers. A cross section of an example of a pneumatic tire is shown in FIG. 11 (as the tire is symmetrical around the tire centerline, only one-half of the tire cross-section is illustrated). The tire has a section height SH and a maximum section width SW. The tire comprises a tread portion 111, a sidewall portion 112, a bead portion 113, and an innerliner 117 comprising the air barrier assembly according to embodiments disclosed herein. In embodiments of the present invention, the pneumatic tire of FIG. 11 has a carcass ply 114 extending between left and right bead portions 113. The carcass ply 114 has a rubber layer comprising reinforcing cords extending in a radial direction of the tire. The carcass ply 114 has opposite ends, which are turned up from an inner side in an axial direction of the tire toward an outer side in the tire axial direction around a bead core 115 embedded in each bead portion 113 so as to sandwich a bead filler 116 therein. A plurality of belt plies 118 are provided radially outwardly of the carcass ply 114 in the tread portion 111 of the tire. A tread rubber layer 119 is placed radially outwardly of the belt plies 118. A side rubber layer 120 is disposed outward of the carcass ply 114 in each sidewall portion 112. A cushion rubber layer 121 is provided in each bead portion 113.

An innerliner 117 comprising any one of the disclosed and permissible embodiments of the air barrier assembly of the present invention is disposed inward of the carcass ply 114. The illustrated innerliner 117 has three layers; one in the art will appreciate the thickness of the innerliner layers are not to scale in comparison to other layers of the tire, but are illustrated thusly for the purpose of describing the invention. The innerliner 117 comprise at least one inner rubber layer 103 and the barrier layer assembly having a support layer 104 and the bi-directionally corrugated barrier film layer 105. Alternatively, the tire innerliner 117 may be a three-layer barrier layer assembly, wherein layer 103 is the elastomeric support layer, layer 104 is an adhesive layer, and 105 is the bi-directionally corrugated barrier film layer.

When employed in the tire as an innerliner component, the barrier layer assembly (either already formed as a multi-laminate structure, corrugated or non-corrugated, or the individual layers thereof) is placed on a tire building drum in a manner similar to a conventional elastomeric innerliner layer with the additional tire elements such as the carcass plies, bead rings, sidewall plies, excluding the tread belt plies and tread rubber, assembled successively in a conventional manner. The tire building drum is inflated to a torodial shape for application of the belt layers and tread rubber. Upon inflation, the green (uncured) tire deforms considerably, but the joins of the tire elements are locally high in rigidity and therefore the joins deform relatively slightly at the time of inflation. Following application of the belt layers and tread rubber, the green tire is cured by heating in a mold for a period of time to produce the fully cured tire.

To maximize the benefit of the three-dimensional surface of the barrier layer assembly, the corrugation pattern is formed in the barrier layer assembly innerliner before the green tire assembly is inflated to a torodial structure. The corrugation pattern may be present prior to the noted inflation by either fully forming the three-dimensional structure before applying the barrier layer assembly to the building drum or by the use of a building drum modified to form the three-dimensional surface on the innermost tire layer, i.e., the barrier film of the barrier layer assembly. If the three-dimension structure is pre-formed (by any applicable method disclosed herein) prior to applying the assembly onto the building drum, further processing of the green tire should be sufficient to preserve the three-dimensional corrugation of the assembly; one proposed method would be the use of a bladderless curing system for the tire. Alternatively, if the corrugated barrier film layer is sandwiched between two elastomeric support layers, the formed three-dimensional structure may be protected from unintentional removal of the pattern. Expansion of the corrugated liner with the green tire would be accommodated mostly by the expansible action of the corrugated film. A typical expansion of the green tire is 45%. It is assumed that the high temperatures of the tire cure would allow stresses developed in stretching the film to relax.

If the corrugation of the barrier layer assembly is formed by the building drum, there may be essentially no stretching of the liner and no tendency for it to pull back from the tire components applied on top of it. In such embodiments, the support layer may be applied on top, bottom, or both sides of the film layer with sufficient pressure to cause the compound to flow into the corrugations and adhere to the barrier layer.

Alternatively, the three-dimensional structure of the barrier layer assembly may be applied after the green tire is torodially expanded. This may be accomplished by contacting at least a portion of the innermost tire innerliner surface with a textured surface during tire curing to form the three-dimensional structure into the barrier layer assembly tire innerliner or the formation of an innerliner free tire wherein the inventive corrugated barrier layer assembly is applied after curing of the tire. When the three-dimensional structure is formed during tire curing, the pattern may be created by the use of a patterned tire curing bladder or segmented metal mold pieces having the desired corrugated surfaces therein so the liner is stretched into the corrugated surfaces as the uncured rubber of the tire conforms to the bladder or mold surface. If the embodiment of an innerlinerless tire is used, the barrier layer assembly of the present invention may be adhesively applied after curing of the tire; in such a construction, a material used as a puncture sealant or a dampening layer may be modified to provide sufficient tack of the barrier layer assembly to the cured tire.

In any of the embodiments disclosed for how to prepare the barrier layer assembly, the barrier layer assembly may be formed with alternating smooth, or non-patterned, portions and bi-directionally corrugated surface portions. Such a barrier layer assembly construction would have applications when the barrier layer assembly is used as a tire innerliner. The smooth surface portions of the barrier layers can be arranged to correspond to the lower sidewalls of the tire and the central tread portion while the bi-directionally corrugated surface portions of the barrier layer assembly can be arranged to correspond to the tire areas subject to greater rotational flex and stress such as tread edges and the shoulder portions of the tire. Referencing FIG. 11, this area could encompass the area within the illustrated circle extending from just axially inward of the belt edges to approximately the maximum tire section width. If the three-dimensional pattern is applied via a modified building drum, patterned curing bladder, or patterned metal mold segments, the locations of desired patterning on the barrier layer assembly may be easily identified or modified.

Specific Embodiments

The invention, accordingly, provides the following embodiments:

Paragraph A: A barrier layer assembly, the assembly comprising a support layer and a film layer bonded thereto, wherein the assembly has a bi-directionally corrugated surface;

Paragraph B: The barrier layer assembly of Paragraph A, wherein the bi-directionally corrugated surface comprises non-sulcate furrows;

Paragraph C: The barrier layer assembly of Paragraph A or B, wherein the barrier layer assembly is reversibly expansible during deformation of the barrier assembly;

Paragraph D: The barrier layer assembly of any one or any combination of Paragraphs A to C, wherein the bi-directionally corrugated surface comprises a three-dimensional structure arranged about a central plane comprising a first curvilinear shape oriented in a first direction along the central plane combined with a second curvilinear shape oriented in a second direction along the central plane non-parallel to the first direction, the curvilinear shape in each direction being the same or different;

Paragraph E: The barrier layer assembly of Paragraph D, wherein i) a period of the first curvilinear shape and a period of the second curvilinear shape differ, or ii) wherein an amplitude of the first curvilinear shape is different than an amplitude of the second curvilinear shape, or iii) both the periods and the amplitudes of the first and second curvilinear shapes differ;

Paragraph F: The barrier layer assembly of Paragraph D, wherein at least a portion of the three-dimensional structure is represented by the equation: $z=a(\sin(bx+\sin(cy)))$ wherein z is the distance orthogonal to the central plane between the structure and the central plane; x is a relative distance in the first direction along a length of the central plane; y is the relative distance in the second direction orthogonal to the first direction and orthogonal to the central plane along the width of the central plane;

Paragraph G: The barrier layer assembly of Paragraph F, wherein a period of the first sinusoidal shape oriented in the first direction is at least twice a period of the second sinusoidal shape oriented in the second direction;

Paragraph H: The barrier layer assembly of any one or any combination of Paragraphs A to G, wherein the film layer of the barrier layer assembly comprises a thermoplastic resin, a dynamically vulcanized alloy, or a combination thereof;

Paragraph I: The barrier layer assembly of any one or any combination of Paragraphs A to H, wherein the film layer of the barrier layer assembly comprises a polyamide resin, a polyester resin, a polynitrile resin, a polymethacrylate resin, a polyvinyl resin, a cellulosic resin, a fluororesin, an imide resin, a polystyrene resin, a polyolefin resin, or a combination thereof;

Paragraph J: The barrier layer assembly of any one or any combination of Paragraphs A to I, wherein the film layer of the barrier layer assembly comprises a dynamically vulcanized alloy comprising a vulcanized elastomer dispersed in a thermoplastic continuous phase;

Paragraph K: The barrier layer assembly of any one or any combination of Paragraphs A to J, wherein the assembly has an opposing side opposite of the bi-directionally corrugated surface and the opposing side has a non-corrugated surface;

Paragraph L: The barrier layer assembly of any one or any combination of Paragraphs A to K, wherein the barrier layer assembly is reversibly deformable in compression, expansion, or shear from a non-deformed dimension to a deformed dimension along any direction and then back without forming sulci;

Paragraph M: The barrier layer assembly of any one or any combination of Paragraphs A to L, wherein the barrier layer assembly has a decreased flexural yield strength, per ASTM D790, from the flexural yield strength of the barrier layer assembly prior to corrugation of the barrier layer assembly;

Paragraph N: The barrier layer assembly of any one or any combination of Paragraphs A to M, having an oxygen permeability of less than about $25 \times 10^{-12}$ cc-cm/cm2·sec·cmHg at 30° C.;

Paragraph O: The barrier layer assembly of any one or any combination of Paragraphs A to N, wherein the barrier layer assembly has a defined width W and the bi-directionally corrugated surface is present on a portion of the barrier layer assembly having a width We less than the barrier layer assembly defined width W;

Paragraph P: The barrier layer assembly of Paragraph O, wherein the surface of the barrier layer assembly having a bi-directionally corrugated surface width We has alternating portions of surface having a smooth surface and the bi-directionally corrugated surface;

Paragraph Q: A tire innerliner comprising the barrier layer assembly of any one or any combination of Paragraphs A to P;

Paragraph R: A tire comprising the tire innerliner of Paragraph Q;

Paragraph S: A method comprising passing a barrier layer substrate between two complementary textured surfaces at a temperature, pressure, and for a period of time sufficient to corrugate the substrate and obtain a bi-directionally corrugated barrier layer;

Paragraph T: The method of Paragraph S, wherein the two complementary textured surfaces comprise opposing rollers;

Paragraph U: A method comprising providing uncured rubber components; providing an innerliner comprising a barrier layer; assembling the uncured rubber components, and the innerliner on an inner surface of the uncured rubber components, into an uncured product assembly; and applying a pressure and temperature to the uncured product assembly to vulcanize the uncured product assembly and form a product comprising the innerliner wherein the barrier layer is bi-directionally corrugated;

Paragraph V: The method of Paragraph U, wherein the barrier layer is corrugated prior to assembly of the innerliner with the uncured rubber components;

Paragraph W: The method of Paragraph U, wherein the barrier layer is corrugated in the innerliner after or concurrent with the assembly of the innerliner with the uncured rubber components by contacting at least a portion of the innerliner with a textured surface at a temperature, pressure, and for a period of time sufficient to corrugate the barrier layer in the innerliner prior to or concurrent with vulcanizing the uncured assembly; and Paragraph X: The method of any one or any combination of Paragraphs U to W, wherein the product comprises a tire.

Examples

The barrier layer assembly was evaluated by finite element modeling (FEM), and also using laminates molded against a corrugated surface. The innerliner of a tire and the adjacent rubber compound are relatively compliant compared to the carcass of a tire as a whole because they do not contain tire cord reinforcement, therefore they undergo strains that are mostly determined by the stiffer reinforced carcass and the overall loading of the tire. However, at a local level, comparable in scale to the thickness of the liner and the rubber compound separating it from the stiff reinforcement, the barrier layer assembly is able to undergo deformations that are different from the overall deformation of the carcass, however, on average, they must be the same as that in the carcass. Tensile testing was conducted using uniaxial tension, performed at various angles with respect to the pattern of corrugation. In addition, it is noted that limitations in machining of the corrugated surface resulted in a mold which approximated a surface defined by $z=a \sin((b\ x+\sin(c\ y)))$, the general findings of the experimental work were verified and extended by FEM. The FEM work modeled a surface defined by $z=a \sin((b\ x+\sin(c\ y)))$ and subjected to multiaxial loading.

Barrier layer assemblies were prepared as laminates by molding a thermoplastic resin layer between two elastomeric layers formulated to represent a typical tire carcass composition. A 100 mm square mold was used along with attached side plates to prevent outward flow. The comparative smooth barrier layers were prepared between two smooth mold surfaces. Examples having one corrugated surface were made using a corrugated mold plate on top and a smooth plate on the bottom.

The corrugations were machined into the surface of the mold using a conical cutter that was moved along a repeated sinusoidal tool path at constant depth across the planar mold surface. The axis of rotation of the cutter was perpendicular to the surface. The period along the valleys (linear distance between two valley peaks) was 6 mm in a first direction and 3 mm in a second direction across the valleys. Depth of the grooves was nominally 2 mm. For this geometry of corrugations, the surface area of the shaped film is greater by approximately a factor of root two (1.4) compared to a planar film.

The elastomer rubber produced to represent a typical rubber tire carcass was produced via Banbury mixing of a non-reactive master batch, followed by final mixing after inclusion of curatives into the master batch; the composition is set forth in Table 1.

TABLE 1

| Composition | phr |
|---|---|
| Natural Rubber TSR 10 (ISNR 10) | 82.00 |
| SBR 1502 | 18.00 |
| Carbon Black N550 | 45.00 |
| Naphthenic Oil (IPOL 501) | 6.00 |
| Zinc Oxide | 3.00 |
| Stearic Acid | 1.50 |
| CBS (Accel CZ-R) | 0.90 |
| SULFUR (RUBBERMAKERS-90) | 2.50 |
| Total phr lab | 158.90 |
| Properties | |
| Mooney ML(1 + 4), 100° C., MV 2000 (ASTM D1646) | 47.3 |
| 100% modulus, MPa | 2.55 |
| 200% modulus, MPa | 6.90 |
| 300% modulus, MPa | 12.83 |
| Tensile at Break, MPa | 22.88 |
| Elong at Break, % | 470 |
| Energy at Break, J | 13.71 |
| Hardness, Shore A | 57 |

The rubber was rolled into nominally 1 mm thick sheets which were stacked to produce the barrier layer assemblies, care being taken to avoid air being trapped between the layers. The mold was sprayed with a thin layer of MS-136W PTFE Water Base Mold Release Agent supplied by Miller-Stephenson Chemical Company Inc. The laminates were assembled in the mold and inserted into pre-heated press at 185° C., cured for 30 minutes under 3 tons of force, and slow cooled in the press.

Samples for tensile testing were cut 0.5 inches wide parallel to the valleys, perpendicular to the valleys, and at 45 degrees to the valleys, or in the case of the smooth laminates, parallel, perpendicular, and at 45 degrees to the machine direction of the barrier film. Three samples were tested in each configuration and the results were averaged.

Tensile testing was conducted on an Instron Model 5565 load frame running BlueHill 3 software with pneumatic grips. The length of sample between grips was 60 mm. An extensometer measured strain. Crosshead speed was 2 inches/min and the samples were taken to 20% extension as measured by the extensomer, returned to 0% extension at the same rate, and then pulled again to 20% extension at the same rate in order to obtain two hysteresis loops. All samples were conditioned for at least 24 hours at 23+/−2° C. and 50%+/−10% relative humidity. The samples were tested in the direction parallel to the valleys of the structure, at 45 degrees to the valley direction and at 90 degrees to the valley direction. The data is set forth in Table 2.

TABLE 2

| Sample | Smooth or corrugated | Barrier film type | Tensile test orientation with respect to film MD (Data normalized to Comparative Example 1) | | |
|---|---|---|---|---|---|
| | | | Parallel | 45 degrees | Perpendicular |
| Comparative Example 1 | Smooth | None | 0.249 (1.00) | | |
| Example 2 | Corrugated | None | 0.193 (0.78) | 0.231 (0.93) | 0.232 (0.93) |
| Comparative Example 3 | Smooth | Polyamide 66 | 1.792 (7.20) | 1.520 (6.11) | 1.628 (6.54) |
| Example 4 | Corrugated | Polyamide 66 | 1.430 (5.75) | 0.799 (3.21) | 0.577 (2.32) |

The thermoplastic resin barrier film was nylon 66 supplied by Alpha Technologies, having thicknesses of 0.0262 mm (average of five measurements across the 130 mm width). In all cases the machine direction (MD) of the film was aligned with the valley direction of the corrugations; the machine direction of the film was in the longitudinal direction of the film.

The tensile behavior of the examples, both inventive and comparative, is explained with reference to the hysteresis curves/loops of FIGS. 12 to 19. The vertical axis is load in N, the horizontal axis is extension expressed as a fraction (i.e., strain), and the scales for all graphs are the same. Maximum extension in all cases was 0.2 (i.e., 20%) strain because FEM analysis of tires has found maximum strains in the innerliner of about +/−20% for tires in a 100% overloaded test condition, which is a combination of under inflation and overloading.

Each hysteresis curve shows the load vs extension for two consecutive load and unload cycles. Testing was performed on each example, starting at zero load and zero extension, in four steps: i) the example was loaded to the maximum extension of 0.2, ii) the load was removed and the example relaxed back towards zero extension, iii) the example was immediately subject to load to return the example to a maximum extension of 0.2 and iv) the load was removed. Thus, each graph shows a continuous line of two loops, each loop being one load cycle. The uppermost curve in each graph is the load v. extension profile for a material never previously elongated and the immediately adjacent lower curve is typical of the load v. extension curve the example would undergo when subject to further deformation cycles. The amount of energy absorbed by the example, or a tire incorporating such an example as a layer therein, is equal to the area between the second cycle load and unload curves. The area encompassed by the load and unload curves of each cycle is also the hysteresis amount of each example.

Comparative example 1 included two layers of rubber, smooth on both sides, without a thermoplastic barrier film, which establishes the baseline behavior. As shown in FIG. 12, comparative example 1 demonstrated a small hysteresis on first and second cycles, with the hysteresis on the second cycle being about half that on first cycle. The unload portion of each cycle are virtually indistinguishable, thus creating the appearance of only three curves in FIG. 12.

Example 2 included two layers of rubber, corrugated on one side, using an elastomer as the barrier layer without a thermoplastic layer, and was tested parallel to the valleys of the structure. As evidenced by a lower load to reach the maximum extension of 0.2, in FIG. 13, the barrier assembly of Example 2 was less stiff than comparative example 1 because the material in the thicker parts of the sample deform less than those in the thinner parts. However, this geometrical effect is small because the maximum depth of the corrugations (1 mm) is less than half the overall thickness of the sample. The total amount of rubber per unit area is the same for all samples.

These results show that introducing corrugations on one side of the sample has little effect on the elastic response other than a reduction in stiffness, regardless of loading direction.

Comparative example 3 was a smooth laminate of thermoplastic film and rubber (i.e. no bi-directional corrugations). The testing was conducted parallel to the longitudinal direction of the nylon film's MD. The data are shown graphically in FIG. 14. As the data shows by the substantially flat portions of the curves, on unloading, the example had undergone permanent elongation and had buckled due to the elastic recovery of the rubber to which it was adhered. It was determined the nylon film was wrinkled by the first load cycle. On second loading, the load rose slowly initially as the nylon film was pulled taught, and then the load/strain curve approximated the initial loading curve, reaching approximately the same maximum load at 0.2 strain. The hysteresis for the second loading was approximately half that on the first loading, and very much greater than in the absence of nylon film. The comparative example showed a buckled condition of the laminate after two loading cycles. The graphed data in FIGS. 15 and 16 shows essentially the same behavior when the comparative example is loaded in the 45° and 90° directions, respectively, to the film MD.

In contrast, the corrugated laminate design of example 4 demonstrates a much more linear response on second loading with a lower hysteresis. FIG. 17 shows example 4 evaluated parallel to the valleys of the structure, which is the first direction (also parallel to the MD of the nylon layer); FIG. 18 shows example 4 evaluated 45° to the first direction of the structure and FIG. 19 shows example 4 evaluated at 90° to the first direction, (i.e., parallel to the second direction).

As these data show by very limited substantially horizontal portions to the curves at the end of each unload cycle and the beginning of each second load cycle, there is very little, if any, apparent wrinkling of the film, unlike the comparative example 3 with no corrugations. This is an indication that the film has largely flexed to accommodate the strain rather than yielding, which is also reflected in the lower hysteresis. Accordingly, the present invention provides the benefit of durability and rolling resistance since the deformation of tires can largely be accommodated by flexure of the liner film rather than yielding.

Any range of numbers recited in the specification hereinabove or in the claims hereinafter, such as that representing a particular set of properties, units of measure, conditions, physical states or percentages, is intended to literally incorporate expressly herein by reference or otherwise, any number falling within such range, including any subset of numbers or ranges subsumed within any range so recited.

All documents described herein are incorporated by reference herein, including any patent applications and/or testing procedures to the extent that they are not inconsistent with this application and claims. The principles, preferred embodiments, and modes of operation of the present invention have been described in the foregoing specification. Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A barrier layer assembly, the assembly comprising a support layer and a film layer bonded thereto, wherein the assembly has a bi-directionally corrugated surface, wherein the film layer of the barrier layer assembly comprises a dynamically vulcanized alloy comprising a vulcanized elastomer dispersed in a thermoplastic continuous phase.

2. The barrier layer assembly of claim 1, wherein the vulcanized elastomer is comprised of butyl rubber, natural rubber, polyisoprene rubber, epoxidized natural rubber, styrene butadiene rubber, hydrogenated styrene butadiene rubber, butadiene rubber, hydrogenated butadiene rubber, star-branched butyl rubber, acrylic nitrile butadiene rubber, hydrogenated acrylic nitrile butadiene rubber, ethylene propylene rubber, ethylene propylene diene rubber, maleic acid-maleic anhydride grafted ethylene propylene rubber, ethylene-glycidyl methacrylate copolymer, maleic anhydride grafted ethyl acrylate copolymer, isobutylene-isoprene rubber, isobutylene-acrylic rubber, brominated butyl rubber, chlorinated butyl rubber, brominated isobutylene-p-methylstyrene copolymer, brominated isobutylene-isoprene rubber, chloroprene rubber, hydrin rubber, chlorosulfonated polyethylene, chlorinated polyethylene, maleic acid grafted chlorinated polyethylene, silicone rubber, halogenated silicone rubber, methylvinyl silicone rubber, dimethyl silicone rubber, methylphenyl vinyl silicone rubber, polysulfide rubber, vinylidene fluoride rubber, halogenated vinyl ether rubber, or combinations thereof.

3. The barrier layer assembly of claim 1, wherein the bi-directionally corrugated surface comprises non-sulcate furrows.

4. The barrier layer assembly of claim 1, wherein the barrier layer assembly is reversibly expansible during deformation of the barrier assembly.

5. The barrier layer assembly of claim 1, wherein the bi-directionally corrugated surface comprises a three-dimensional structure arranged about a central plane comprising a first curvilinear shape oriented in a first direction along the central plane combined with a second curvilinear shape oriented in a second direction along the central plane non-parallel to the first direction, the curvilinear shape in each direction being the same or different.

6. The barrier layer assembly of claim 5, wherein i) a period of the first curvilinear shape and a period of the second curvilinear shape differ, or ii) wherein an amplitude of the first curvilinear shape is different than an amplitude of the second curvilinear shape, or iii) both the periods and the amplitudes of the first and second curvilinear shapes differ.

7. The barrier layer assembly of claim 5, wherein at least a portion of the three-dimensional structure is represented by the equation:

$$z=a(\sin(bx)+\sin(cy)))$$

wherein z is the distance orthogonal to the central plane between the structure and the central plane;

x is a relative distance in the first direction along a length of the central plane;

y is the relative distance in the second direction orthogonal to the first direction and orthogonal to the central plane along the width of the central plane.

8. The barrier layer assembly of claim 7, wherein a period of the first sinusoidal shape oriented in the first direction is at least twice a period of the second sinusoidal shape oriented in the second direction.

9. The barrier layer assembly of claim 1, wherein the assembly has an opposing side opposite of the bi-directionally corrugated surface and the opposing side has a non-corrugated surface.

10. The barrier layer assembly of claim 1, wherein the barrier layer assembly is reversibly deformable in compression, expansion, or shear from a non-deformed dimension to a deformed dimension along any direction and then back without forming sulci.

11. The barrier layer assembly of claim 1, wherein the barrier layer assembly has a decreased flexural yield strength, per ASTM D790, from the flexural yield strength of the barrier layer assembly prior to corrugation of the barrier layer assembly.

12. The barrier layer assembly of claim 1 having an oxygen permeability of less than about $25 \times 10^{-12}$ cc-cm/cm$^2$-sec-cm Hg at 30° C.

13. The barrier layer assembly of claim 1, wherein the barrier layer assembly has a defined width W and the bi-directionally corrugated surface is present on a portion of the barrier layer assembly having a width We less than the barrier layer assembly defined width W.

14. The barrier layer assembly of claim 13, wherein the surface of the barrier layer assembly having a bi-directionally corrugated surface width We has alternating portions of surface having a smooth surface and the bi-directionally corrugated surface.

15. A barrier layer assembly, the assembly comprising a support layer and a film layer bonded thereto, wherein the assembly has a bi-directionally corrugated surface, and wherein the support layer is comprised of an elastomeric composition;

wherein the bi-directionally corrugated surface comprises a three-dimensional structure arranged about a central plane comprising a first curvilinear shape oriented in a first direction along the central plane combined with a second curvilinear shape oriented in a second direction along the central plane non-parallel to the first direction, the curvilinear shape in each direction being the same or different; and wherein at least a portion of the three-dimensional structure is represented by the equation:

$$z = a(\sin(bx + \sin(cy)))$$

wherein z is the distance orthogonal to the central plane between the structure and the central plane;

x is a relative distance in the first direction along a length of the central plane;

y is the relative distance in the second direction orthogonal to the first direction and orthogonal to the central plane along the width of the central plane.

* * * * *